(12) United States Patent
Friedrich et al.

(10) Patent No.: US 12,332,273 B2
(45) Date of Patent: Jun. 17, 2025

(54) HIGH RESOLUTION SENSING PROTOCOL

(71) Applicant: Allegro Micro Systems, LLC, Manchester, NH (US)

(72) Inventors: Andreas P. Friedrich, Metz-Tessy (FR); Solène Bastien, Naves-Permelan (FR); Loïc André Messier, Vanzy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 343 days.

(21) Appl. No.: 17/663,930

(22) Filed: May 18, 2022

(65) Prior Publication Data

US 2023/0400477 A1 Dec. 14, 2023

(51) Int. Cl.
| | |
|---|---|
| *G01P 3/489* | (2006.01) |
| *B60R 16/023* | (2006.01) |
| *G01P 3/487* | (2006.01) |
| *G01P 21/02* | (2006.01) |
| *H04L 41/0681* | (2022.01) |
| *H04L 67/12* | (2022.01) |

(52) U.S. Cl.
CPC ............ *G01P 3/489* (2013.01); *B60R 16/023* (2013.01); *H04L 41/0681* (2013.01); *H04L 67/12* (2013.01); *G01P 3/487* (2013.01); *G01P 21/02* (2013.01)

(58) Field of Classification Search
CPC .......... G01P 3/489; G01P 3/487; G01P 21/02; B60R 16/023; H04L 41/0681; H04L 67/12; G01D 5/244; G01D 21/00; G01D 5/145
USPC ........................................................ 324/179
See application file for complete search history.

(56) References Cited

U.S. PATENT DOCUMENTS

| | | |
|---|---|---|
| 6,542,847 B1 | 4/2003 | Lohberg et al. |
| 6,687,644 B1 | 2/2004 | Zinke et al. |
| 7,091,876 B2 | 8/2006 | Steger |

(Continued)

FOREIGN PATENT DOCUMENTS

| | | |
|---|---|---|
| DE | 10 2017 125562 | 5/2018 |
| DE | 10-2017-125562 A1 | 5/2018 |

(Continued)

OTHER PUBLICATIONS

Partial European Search Report dated Sep. 27, 2023 for European Application No. EP23174177.8; 15 Pages.

(Continued)

*Primary Examiner* — Raul J Rios Russo
(74) *Attorney, Agent, or Firm* — DALY, CROWLEY, MOFFORD & DURKEE, LLP

(57) ABSTRACT

Electronic circuits and methods sense an electromagnetic property of a target, and transmit data packets that encode the property along with diagnostic messages while avoiding data loss due to truncation at high sensing speeds. Data address bits may be used to split messages across multiple data packets. Data bits may be combined into a unified header that takes less time to transmit than in prior communication protocols. The transmission duration of each data bit may be lowered, thereby increasing throughput. The receiving system may synchronize its own operation against these shortened data bits, increasing its speed. Error packets may be sent between data packets, thereby reducing time to respond to faults in safety-critical systems. And additional current levels may be used to increase the data information rate.

18 Claims, 16 Drawing Sheets

(56) References Cited

U.S. PATENT DOCUMENTS

| | | | |
|---|---|---|---|
| 9,664,748 | B2 | 5/2017 | Friedrich et al. |
| 10,216,559 | B2 | 2/2019 | Fernandez |
| 10,436,606 | B2 | 10/2019 | Kerdraon et al. |
| 10,480,957 | B2 | 11/2019 | Kerdraon et al. |
| 10,481,218 | B2 | 11/2019 | Prentice et al. |
| 10,495,700 | B2 | 12/2019 | Prentice et al. |
| 10,598,514 | B2 | 3/2020 | Pepka et al. |
| 10,656,170 | B2 | 5/2020 | Lim et al. |
| 11,125,590 | B2 | 9/2021 | Geiger et al. |
| 2007/0088869 | A1 | 4/2007 | Kadota |
| 2011/0250862 | A1 | 10/2011 | Schliwa-Bertling et al. |
| 2012/0177096 | A1 | 7/2012 | Yano et al. |
| 2013/0046488 | A1* | 2/2013 | Donovan ............. G01P 3/489 702/57 |
| 2014/0210641 | A1 | 7/2014 | Hammerschmidt |
| 2016/0123771 | A1* | 5/2016 | David .............. G01D 5/2013 324/207.2 |
| 2017/0307407 | A1* | 10/2017 | Judkins, III ........... G01R 33/07 |
| 2017/0315146 | A1* | 11/2017 | Koeck ................. G01L 3/101 |
| 2018/0067174 | A1 | 3/2018 | Prentice et al. |
| 2020/0049729 | A1* | 2/2020 | Jeon .................... H03K 3/59 |
| 2021/0262831 | A1* | 8/2021 | Foletto ............... G01D 5/145 |
| 2023/0378977 | A1 | 11/2023 | Bastien et al. |

FOREIGN PATENT DOCUMENTS

| | | |
|---|---|---|
| DE | 10 2019 133440 | 6/2021 |
| DE | 10-2019-133440 A1 | 6/2021 |
| EP | 1490772 | 12/2004 |

OTHER PUBLICATIONS

Extended European Search Report dated Jan. 8, 2024 for European Application No. 23174177.8; 13 Pages.

Response to Extended European Search Report (EESR) dated Jan. 8, 2024 for European Application No. 23174177.8; Response filed Aug. 7, 2024; 66 Pages.

Allegro MicroSystems, LLC datasheet A19350 "High-Accuracy GMR Wheel Speed and Direction Sensor IC"; Nov. 16, 2018; 14 Pages.

Infineon Technologies; "High-End GMR Wheel Speed Sensor with direction detection, ASIL B(D);" TLE5046iC Product Description; Jun. 2020; 14 pages.

Pancik, et al. "Open source based peripherals for automotive electronic control unit"; EAI Endorsed Transactions on Scalable Information Systems; Jun. 19, 2018; 7 Pages.

Office Action dated Feb. 12, 2025 for U.S. Appl. No. 18/355,623, 23 pages.

U.S. Appl. No. 18/435,241, filed Feb. 7, 2024, Rivas et al.

Response to U.S. Non-Final Office Action dated Feb. 12, 2025 for U.S. Appl. No. 18/335,623; Response filed Feb. 24, 2025; 11 Pages.

Allegro MicroSystems, LLC, "High-Resolution GMR Wheel Speed and Distance Sensor IC;" Data Sheet A19360, Rev. 2; Dec. 6, 2022; 18 Pages.

European Intention to Grant dated Mar. 11, 2025 for European Application No. EP23174177.8; 7 Pages.

* cited by examiner

HIGH RESOLUTION SENSING PROTOCOL

FIELD

The disclosure pertains generally to measuring electromagnetic properties of a target, and more particularly to digital circuits for measuring frequency of generated current pulse signals.

BACKGROUND

Magnetic field sensors can be used in various types of devices to measure and monitor properties of systems in a wide variety of different applications. For example, sensors have become common in products that rely on electronics in their operation, such as motor control systems and automobile control systems. In automotive applications, a Hall-based or magneto-resistive sensor is used in combination with a ring magnet to monitor and measure the wheel speed, detect direction of rotation, and provide other information to the car's electronic control unit (ECU). The ECU, in turn, may use these data for passive monitoring and display or for active control as part of an anti-lock braking system (ABS), parking assist (e.g. automatic parallel parking), and other such systems. In this connection, FIG. 1A shows a known system for detecting rotation of a wheel. An ABS sensor rotor includes a magnetic position encoder (e.g. a magnetic rubber strip) around its circumference. The ABS wheel-speed sensor includes a semiconductor sensing element and an active drive circuit. As the wheel turns, alternating north and south magnetic poles are presented to the sensor, which forwards pulses to the ECU as shown in FIG. 1B. By timing these "speed pulses", the ECU can determine the angular speed of the wheel. Although FIG. 1B shows that a rectangular pulse is sent for each identical (e.g. North) magnetic pole, other systems send pulses when opposite (e.g. North and South) poles are presented to the sensor, thereby doubling the reporting speed of data to the ECU.

Wheel speed sensors may communicate with the ECU through a two-wire, digital, current level protocol; that is, the two wires providing power to the wheel speed sensor are used to communicate data to the ECU by varying the current level according to discrete thresholds. FIG. 2 shows a single message in a widely-used current level protocol called the "AK-protocol". Each message is generally composed of a high-current speed pulse to indicate target speed, followed by medium or low-current, semantically-fixed bits of data; see U.S. Pat. Nos. 6,542,847 and 6,687,644 for detailed information on the meaning of each data bit. The speed pulse has a width $t_p=50$ µs (microseconds), and there are gaps of $t_p/2=25$ µs between the speed pulse and surrounding data bits. Each data bit, in turn, uses $t_p=50$ µs of time. As shown in the Figure, a data bit having a central falling edge is read as having the value "0" while a data bit having a central rising edge is read as having the value "1". In the AK-protocol, a "standstill" message is generated every duration of 150 ms (milliseconds) that no speed pulses are generated, to indicate that the wheel is at a standstill.

The most common type of wheel speed system uses simple resolution, which means two speed pulses with associated messages are sent per magnetic period (i.e., per ring magnet pole pair). FIG. 3A shows several messages from a wheel speed sensor to the ECU in a vehicle. If the vehicle accelerates, the magnetic poles on the wheel rotor are presented to the wheel speed sensor with increasing frequency, and the gap between the speed pulses (and their subsequent data messages) decreases as time progresses, while if the vehicle decelerates, the gap between the speed pulses increases. FIG. 3A shows a vehicle undergoing acceleration.

However, higher data resolution is required with the adoption of advanced driver-assistance systems (ADAS) and Society of Automotive Engineers (SAE) standards for autonomous driving. This can be achieved either using a ring magnet with a higher number of pole pairs, or a sensor that can generate a higher number of output pulses. In either case, higher output resolution leads to more speed pulses per unit time. This increase in data frequency can lead to truncation of data bits on the AK-protocol, losing most of the information transmitted on the data bits. As shown in FIG. 3B, data truncation already occurs in simple resolution systems at high wheel speed (i.e., high magnetic stimulus frequency), and occurs even in high resolution systems. When the ECU receives truncated data, it has less information to apply to computations relating to vehicle safety, and the latter is correspondingly diminished.

SUMMARY OF DISCLOSED EMBODIMENTS

Disclosed embodiments increase the amount of informational data on the sensor output and avoid loss of information if data bits are truncated. Embodiments also offer solutions to existing limitations in the prior art, those solutions including reducing the overall current consumption and reducing fault detection time to improve system safety.

In one aspect, an embodiment may combine a pulse indicating a measurable property of a target with one or more data bits that occur in a next, subsequent cycle. For example, the embodiment may combine a speed pulse with data that indicate target direction and/or whether an error has occurred. By doing so, the embodiment may advantageously reduce power output. The target may be an automotive wheel and its property may be rotational speed, or the target may be an electrical circuit and its property may be current or voltage. It is appreciated that the concepts, techniques, and structures disclosed herein may be used with a variety of targets and measurable properties.

In another aspect, an embodiment may accommodate increased sensor data by spreading data across multiple messages, each message triggered by a separate speed pulse. To synchronize data from separate messages at the data consumer (e.g. a vehicle ECU), the protocol may be modified by the inclusion of one or more bits of addressing data. Toggling a single address bit, or incrementing a multi-bit address, may indicate to the data consumer that a new message is beginning. In this way, data of arbitrary size may be spread across different messages. The message lengths themselves may be adjusted according to detected external message forcing (e.g. by frequency of received speed pulses).

In yet another aspect, an embodiment may improve fault detection time through standstill message forcing. That is, the embodiment may transmit a "heartbeat" message, that is ordinarily limited to periods of target non-activity (e.g. wheel non-rotation), immediately upon detection of a fault. The data consumer will detect this unusual message transmission, and thereby determine that an error has occurred. Data in the standstill message may be tailored to describe the fault, and thus may have a different format than data in the above-described data messages.

In still another aspect, an embodiment may use different protocol current levels to encode more information per unit of time. Prior art protocols may use one current level to indicate a speed pulse and two other current levels to indicate rising and falling edges in data bits. The addition of further current levels enables transmission and detection of more current levels, and of rising and falling edges between them, multiplying the amount of data that can be conveyed during any bit pulse interval of duration $t_p$.

Thus, a first embodiment comprises a method of transmitting packets of data that pertain to a target. The method of transmitting packets of data includes sensing a first signed magnitude of an electromagnetic property of the target. The method also includes transmitting a first packet of data, the first packet of data having a first header that encodes the first signed magnitude, followed by first payload pulses that encode a first portion of a message associated with the target. The method also includes sensing a second signed magnitude of the electromagnetic property of the target. The method also include transmitting a second packet of data, the second packet of data having a second header that encodes the second signed magnitude, followed by second payload pulses that encode a second portion of the message associated with the target.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. Transmitting each packet of data further may include transmitting digital electrical pulses that encode one or more bits of configurable information, a parity bit for the second packet of data, or both. Transmitting the first packet of data further may include transmitting digital electrical pulses that encode a first message address. Transmitting the second packet of data further may include transmitting digital electrical pulses that encode the first message address, where the message may include the first portion concatenated with the second portion. Transmitting the second packet of data further may include transmitting digital electrical pulses that encode a second message address, where the message may include the first portion concatenated with the second portion. An encoding format of the first and second payload pulses is determined by the first message address.

Another embodiment includes an electronic circuit for transmitting packets of data that pertain to a target. The electronic circuit also includes at least one sensing element for repeatedly sensing a signed magnitude of an electromagnetic property of the target; an output signal generator for transmitting packets of data; and a controller for responding, to the at least one sensing element sensing the property of the target, by causing the output generator to transmit a plurality of packets of data, each packet of data having a header that encodes a sensed, signed magnitude followed by payload pulses that encode a respective portion of a message associated with the target; where the message may include a concatenation of the respective portions.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. Each packet of data transmitted by the output signal generator further may include digital electrical pulses that encode one or more bits of configurable information, a parity bit for the packet of data, or both. The controller is configured to cause the output generator to transmit, in a first one of the plurality of packets of data, digital electrical pulses that encode a first message address. The controller is configured to cause the output generator to transmit, in a second one of the plurality of packets of data, digital electrical pulses that encode the first message address. The controller is configured to cause the output generator to transmit, in a second one of the plurality of packets of data, digital electrical pulses that encode a second message address. The controller is configured to cause the output generator to transmit the plurality of packets of data according to an encoding format which is determined by the first message address. Each payload pulse has a fixed duration. The fixed duration may be at most 25 microseconds.

Another embodiment includes a method of transmitting packets of data that pertain to a target. The method of transmitting packets of data also includes sensing a signed magnitude of an electromagnetic property of the target. The method also include transmitting a packet of data, the packet of data having a header that encodes the signed magnitude, followed by payload pulses that encode a message associated with the target. The method also include where the header may include three consecutive, uninterrupted digital electrical pulses, each pulse having the same fixed duration. The method also include where the first pulse has a first current level and encodes the sensed magnitude; where the second pulse has a second current level when the sensed sign is negative and the second pulse has a third current level when the sensed sign is positive, and where the third pulse has the second current level when an error has occurred and the third pulse has the third current level when no error has occurred.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. The method may include, by a receiver: receiving the transmitted packet of data, including the first pulse; synchronizing an oscillator according to the fixed duration of the received first pulse; and decoding the packet of data using the synchronized oscillator. The receiver may include an automobile electronic control unit. Transmitting the packet of data further may include transmitting additional digital electrical pulses that encode one or more bits of configurable information and a parity bit for the packet of data. The fixed duration may be at most 25 microseconds. The first current level is greater than the second current level and the second current level is greater than the third current level. The first current level may be at most 28 milliamperes (mA), the second current level may be at most 14 mA, and the third current level may be at most 7 mA. Transmitting the packet of data may include transmitting a first packet of data having payload pulses that encode a first portion of the message associated with the target, and transmitting a second packet of data having payload pulses that encode a second portion of the message associated with the target.

Another embodiment includes an electronic circuit for transmitting packets of data that pertain to a target. The electronic circuit also includes at least one sensing element for sensing a signed magnitude of an electromagnetic property of the target; and an output signal generator for transmitting packets of data. The circuit also includes a controller for responding, to the at least one sensing element sensing the property of the target, by causing the output generator to transmit a packet of data, the packet of data having a header that encodes the signed magnitude, followed by payload pulses that encode a message associated with the target. The circuit also includes where the header may include three consecutive, uninterrupted digital electrical pulses, each pulse having the same fixed duration. The circuit also includes where the first pulse has a first current level and encodes the sensed magnitude; where the second pulse has a second current level when the sensed sign is negative and the second pulse has a third current level when the sensed sign is positive, and where the third pulse has the second current level when an error has occurred and the third pulse has the third current level when no error has occurred.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. The electronic circuit may include a receiver for: receiving the transmitted packet of data, including the first pulse; synchronizing an oscillator according to the fixed duration of the received first pulse; and decoding the packet of data using the synchronized oscillator. The receiver may include an automobile electronic control unit. Transmitting the packet of data further may include transmitting additional digital electrical pulses that encode one or more bits of configurable information and a parity bit for the packet of data. The fixed duration may be at most 25 microseconds. The first current level is greater than the second current level and the second current level is greater than the third current level. The first current level may be at most 28 milliamperes (mA), the second current level may be at most 14 mA, and the third current level may be at most 7 mA. The controller is configured to transmit the packet of data by transmitting a first packet of data having payload pulses that encode a first portion of the message associated with the target, and transmitting a second packet of data having payload pulses that encode a second portion of the message associated with the target.

Another embodiment includes a method of transmitting packets of data that pertain to a target. The method of transmitting packets of data also includes repeatedly (a) sensing a signed magnitude of an electromagnetic property of the target and (b) responsively transmitting a packet of data that encodes the sensed signed magnitude followed by payload pulses that collectively encode a message associated with the target. The method also include after beginning to responsively transmit a given packet of data, receiving an indication that an error has occurred. The method also include after finishing transmission of the given packet of data but before subsequently sensing the signed magnitude of the electromagnetic property, beginning to transmit an error data packet encoding data that indicate the error has occurred.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. The error data packet encodes data that indicate a type of the error. The error data packet indicates that the electromagnetic property of the target was not sensed, or that the electronic sensor circuitry has detected an internal fault. Beginning to transmit the error data packet occurs within a fault-handling time interval after the error has occurred. The fault-handling time interval may be at most 20 milliseconds.

Another embodiment includes an electronic circuit for transmitting packets of data that pertain to a target. The electronic circuit also includes at least one sensing element for sensing a signed magnitude of an electromagnetic property of the target; an output signal generator for transmitting packets of data. The circuit also includes a controller for: responding, to the at least one sensing element sensing the property of the target, by causing the output generator to transmit a packet of data that encodes the sensed signed magnitude followed by payload pulses that collectively encode a message associated with the target; after beginning to transmit a given packet of data, receiving an indication that an error has occurred; and after finishing transmission of the given packet of data but before subsequently sensing the signed magnitude of the electromagnetic property, causing the output generator to begin to transmit an error data packet encoding data that indicate the error has occurred.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. The error data packet encodes data that indicate a type of the error. The error data packet indicates that the electromagnetic property of the target was not sensed, or that the electronic sensor circuitry has detected an internal fault. Beginning to transmit the error data packet occurs within a fault-handling time interval after the error has occurred. The fault-handling time interval may be at most 20 milliseconds.

Another embodiment includes a method of transmitting packets of data that pertain to a target. The method of transmitting packets of data also includes repeatedly sensing a signed magnitude of an electromagnetic property of the target and responsively transmitting a packet of data that encodes the sensed signed magnitude followed by payload pulses that encode a message associated with the target. The method also include where transmitting the packet of data includes encoding the sensed signed magnitude according to a first current level, and encoding the message according to second, third, and fourth current levels.

Implementations may include one or more of the following features. The target may be associated with a magnetic field, and sensing the property of the target may include sensing a magnitude and a direction of the magnetic field. The target may comprise a wheel, so that the signed magnitude of the magnetic field indicates a direction and speed of rotation of the wheel. The first current level may be at most 28 milliamperes (mA), the second current level may be at most 14 mA, the third current level may be at most 10 mA, and the fourth current level may be at most 7 mA. Transmitting the packet of data may include transmitting according to a current level that encodes at least two bits of information. Transmitting the packet of data may include transmitting a rising edge from a current floor, or a falling edge to the current floor. Transmitting the packet of data may include transmitting a rising edge or a falling edge from any of the second, third, and fourth current levels to any other of the second, third, and fourth current levels.

Another embodiment includes an electronic circuit for transmitting packets of data that pertain to a target. The electronic circuit also includes at least one sensing element for sensing a signed magnitude of an electromagnetic property of the target; an output signal generator for transmitting packets of data. The circuit also includes a controller for responding, to the at least one sensing element sensing the property of the target, by causing the output generator to transmit a packet of data that encodes the sensed signed magnitude followed by payload pulses that encode a message associated with the target. The circuit also includes where transmitting the packet of data includes encoding the sensed signed magnitude according to a first current level, and encoding the message according to second, third, and fourth current levels.

Implementations may include one or more of the following features. The target may be associated with a magnetic field, and sensing the property of the target may include sensing a magnitude and a direction of the magnetic field. The first current level may be at most 28 milliamperes (mA), the second current level may be at most 14 mA, the third current level may be at most 10 mA, and the fourth current level may be at most 7 mA. Transmitting the packet of data may include transmitting according to a current level that encodes at least two bits of information. Transmitting the packet of data may include transmitting a rising edge from a current floor, or a falling edge to the current floor. Transmitting the packet of data may include transmitting a rising edge or a falling edge from any of the second, third, and fourth current levels to any other of the second, third, and fourth current levels.

It is appreciated that the concepts, techniques, and structures disclosed herein may be embodied in other ways, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable sub-combination. Moreover, other embodiments not specifically described herein also may be within the scope of the claims set forth below.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

Figure 4A:
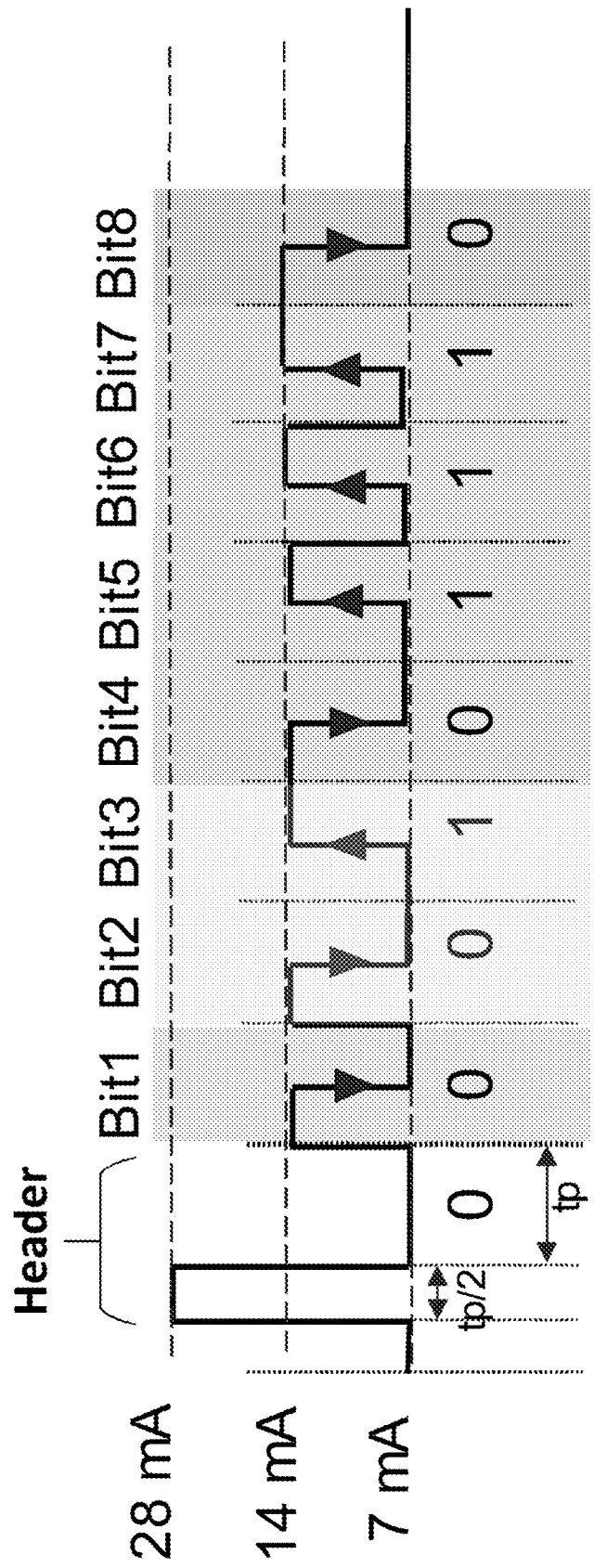
FIG. 4A shows a packet of data having digital electrical pulses according to a first embodiment of the concepts, techniques, and structures disclosed herein.

FIG. 4A shows a packet of data having digital electrical pulses according to a first embodiment of the concepts, techniques, and structures disclosed herein. Data packets are encoded as follows. Each packet of data starts with a header providing three consecutive, uninterrupted electrical pulses each having a pulse half-width ($t_p/2$, illustratively 25 µs), followed by eight data bits numbered Bit 1 through Bit 8 each having a full pulse width ($t_p$, illustratively 50 µs). In the embodiment shown in FIG. 4A, the first half-width pulse encodes the magnitude of a sensed property, such as a magnetic field strength, current level, or other measurable characteristic of a physical target. The second and third header pulses use two or more different current levels to indicate additional, programmable values. For purposes of clarity, the second and third header pulses are described in what follows to indicate (a) a sign or direction that is associated with the sensed property (i.e. if the property has a signed magnitude), and (b) an error indicator. However, it is appreciated that other sensed values may be substituted for a direction and error indicator in other embodiments.

The remaining Bits 1 to 8 of a data packet following the header may be encoded to represent other data. The semantics of these Bits may differ in various embodiments, but illustratively they may represent the following information. Bit 1 may represent a message address or message selector, to enable the protocol to transmit messages on different logical channels or with respect to different sensed properties. Bits 2 and 3 may be programmed by a customer, and accordingly may be computationally unused by the protocol as described herein. Bits 4 through 7 may be used to encode message data. And Bit 8 may be used to provide parity information for the entire data packet, using techniques known in the art.

Figures 1A, 1B:
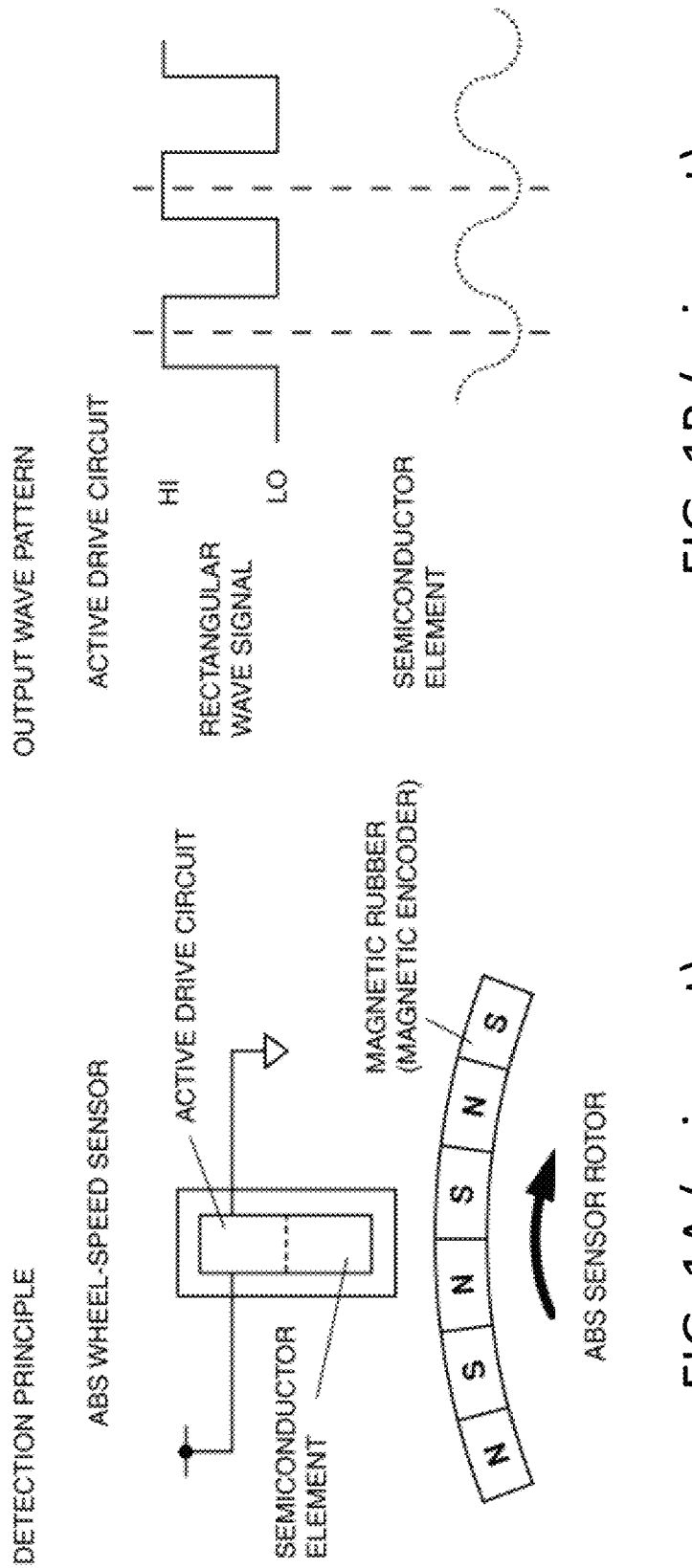
FIG. 1A schematically shows a known wheel-speed sensor arrangement for sensing a varying magnetic stimulus field.
FIG. 1B shows digital speed pulses that are output from the wheel-speed sensor of FIG. 1A.

In embodiments, the first pulse of the header may encode a magnitude using an electrical characteristic of the pulse itself, such as its current level. Alternately, the current level may be held fixed, and the first pulse may encode the measured magnitude as a function of the timing between data packets, as in the illustrative wheel speed sensor shown and described in connection with FIGS. 1-3.

It is appreciated that the physical target may be any object or system having measurable properties; however, for purposes of concise disclosure, further discussion of embodiments will focus on wheel speed sensors. Example sensed properties can include, but are not limited to, position, direction, vibration, pressure, temperature, light, and/or sound. Sensor types suitable to detect and measure target properties can include a variety of sensing elements such as magnetic field sensing elements, pressure sensing elements, temperature sensing elements, light sensing elements, and/or acoustic sensing elements. In the case of magnetic field sensing elements, In the area of magnetic field sensors, example sensor types include angle sensors that senses an angle of a direction of a magnetic field, current sensors that senses a magnetic field generated by a current carried by a current-carrying conductor, magnetic switches that senses proximity of a target, rotation detectors that senses passing target features, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Figure 4B:
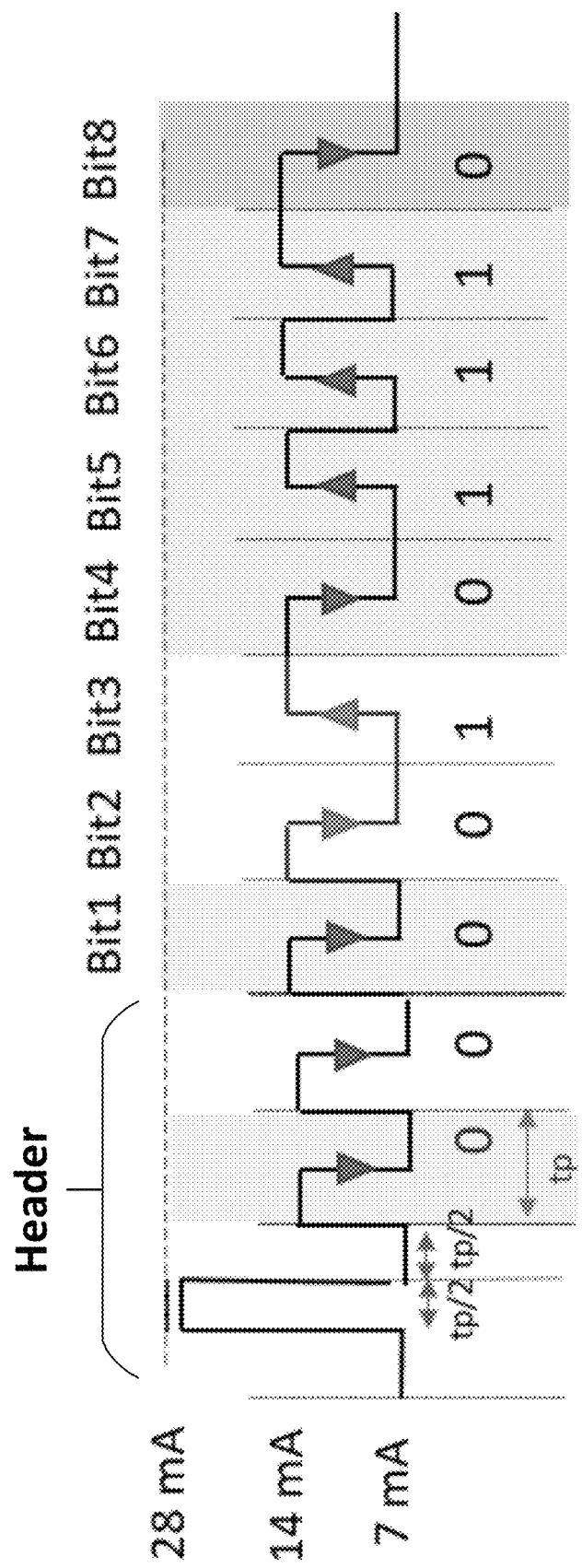
FIG. 4B shows a packet of data having digital electrical pulses according to a second embodiment of the concepts, techniques, and structures disclosed herein.

FIG. 4B shows a packet of data having digital electrical pulses according to a second embodiment of the concepts, techniques, and structures disclosed herein. It is appreciated that some vehicle ECUs synchronize a clock used for sensor data processing on the speed pulse (i.e. the pulse shown at 28 mA), and that these ECUs may be unable to process a header that does not include a $t_p/2$ gap following the speed pulse as shown in FIG. 4A. Thus, the embodiment of FIG. 4B provides a $t_p/2$ gap after the speed pulse, with the second and third pulses of the header encoded as standard data bits and Bits 1 through 8 encoded as described above. A packet of data encoded this way accordingly provides the benefits of the encoding of FIG. 4A, but may be used advantageously with existing ECUs.

Illustratively, embodiments according to either FIG. 4A or FIG. 4B generate second and third pulses of the header having the smallest average power output. In connection with automotive wheel speed sensor embodiments, ordinary operation of the automobile favors rotation in the forward direction over the reverse, and error conditions occur less frequently than an error-free condition. Thus, in these embodiments, a second pulse indicating a forward direction of rotation uses less average power than a pulse indicating a reverse direction, and a third pulse indicating no error uses less average power than a pulse indicating that an error has occurred. In some embodiments, power savings is achieved using lower current levels, while in other embodiments this is done using shorter pulse widths. The particular technique may be adjusted to the control system (e.g. an automobile's ECU). It is appreciated that these techniques are merely illustrative, and power savings in embodiments may be achieved in other ways not expressly listed herein.

FIG. 5A to FIG. 5D (collectively, "FIG. 5") shows pulses according to an embodiment having the header of FIG. 4A, combining three pulses to encode information about magnitude, sign or direction, and the presence or absence of an error. Illustratively, the three pulses each have a duration of 25 microsections (μs) and different current levels are used to indicate direction and error status. It is appreciated that embodiments may use shorter durations to enable higher data rates. As described above, each combination of three pulses begins with a first half-width pulse as shown.

Figure 5B:
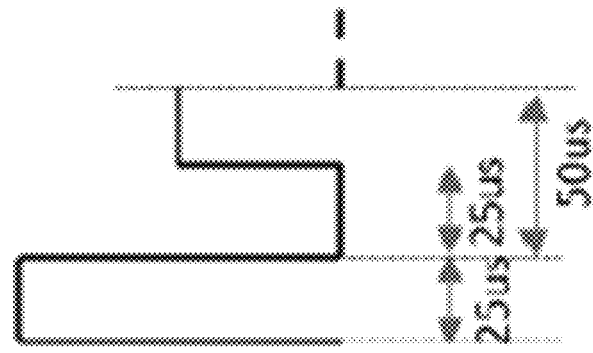
FIG. 5A to FIG. 5D (collectively, "FIG. 5") shows pulses according to an embodiment combining three pulses to encode information about magnitude, direction, and the presence or absence of an error.
Figure 5A:
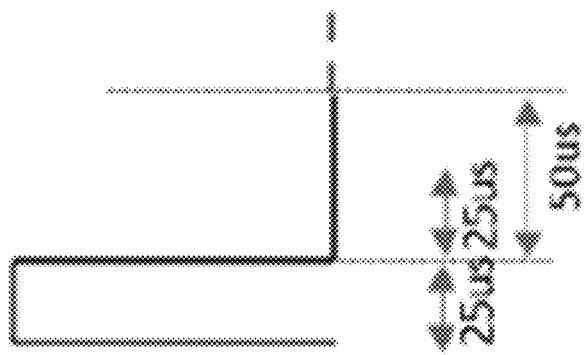

If a wheel is rotating in the forward direction (i.e. its speed has a positive sign) and no error has occurred, then the two lowest current levels are used and the combination of pulses appears as in FIG. 5A. If the wheel is rotating in the forward direction but an error has occurred, then the second pulse uses the lowest current level but the third pulse uses a higher current level as shown in FIG. 5B. It is appreciated that the higher current level need not be the same as (and especially as high as) that of the first pulse, to provide power savings.

Figure 5D:
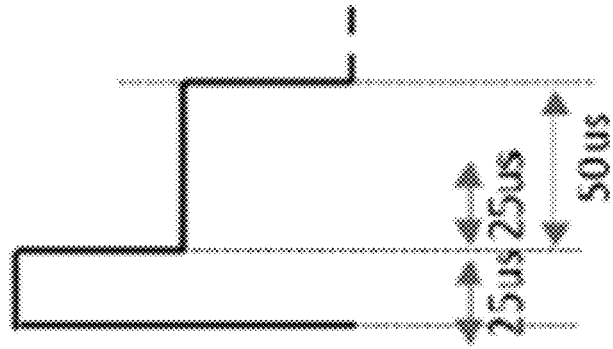
Figure 5C:
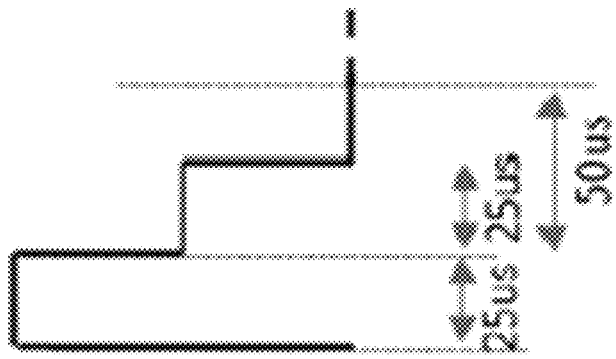

Likewise, if the wheel is rotating in the reverse direction (i.e. its speed has a negative sign) and no error has occurred, then the higher current level is used for the second pulse and the lowest current level is used for the third pulse as shown in FIG. 5C. And if the wheel is rotating in the reverse direction and an error has occurred, then the higher current level is used for both the second and third pulses as shown in FIG. 5D.

An encoding of the header according to FIG. 4B according to the smallest average power output principles of FIG. 5 and discussed above should be apparent to a person having ordinary skill in the art.

Errors may be detected from any of a number of error sources or sensors that are coupled to the target being sensed. For example, and without limitation, in the case of an automobile tire an error may be generated by a tire pressure sensor if the pressure is too high or too low. Moreover, multiple error sources may be joined together (e.g. using a logical OR) so that an error indicated by any source results in the protocol encoding an error indication in the third pulse. With a dedicated time slot reserved in the header for an error indicator, an ECU is immediately notified in case of internal error and can react accordingly (e.g., cause the vehicle to decelerate). As vehicle speed is reduced, data packets triggered by wheel rotation speed become less frequent and cease being truncated, and the corresponding error code will be available by reading the data bits. Alternately, when an error occurs, the wheel speed sensor may transmit a forced standstill message, as described below in connection with FIG. 8.

Figure 6:
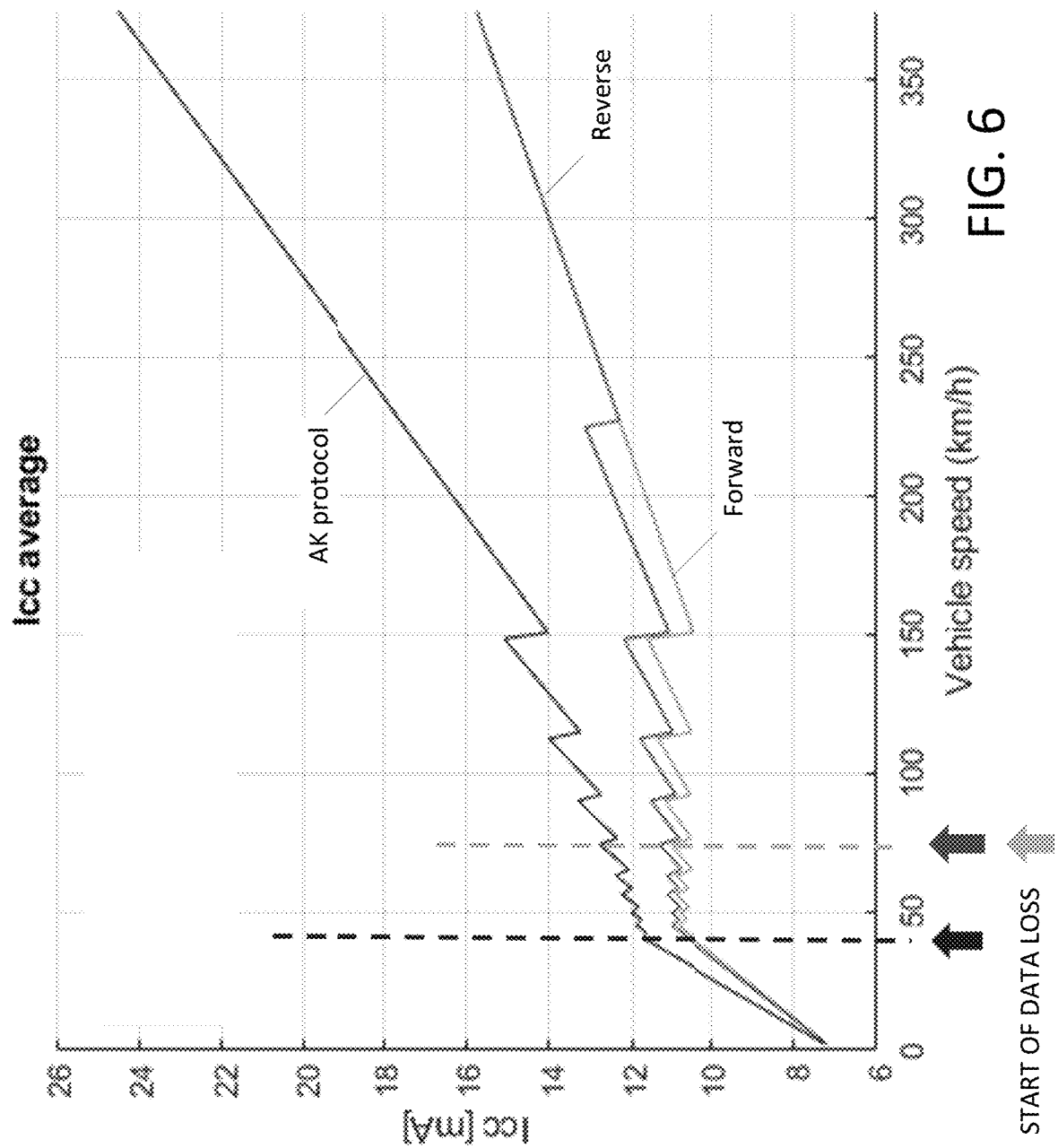
FIG. 6 shows average current as a function of target signal (e.g. speed pulse) input frequency.

FIG. 6 shows average current as a function of target signal (e.g. speed pulse) input frequency in accordance with an embodiment. In this Figure, three curves are plotted: one power curve for a prior art protocol, and two curves for the embodiments of FIGS. 4A and 5. Each curve shows a linear trend of increasing power consumption until truncation begins; that is, until bits at the end of each data message fail to transmit due to increased message frequency, as discussed above in connection with FIG. 3B. The failure of a data bit to transmit results in a reduced average power consumption, indicated by a downward-sloping portion, after which the current increases again as transmission frequency increases due to increased wheel speed. It may be appreciated that each curve contains 9 "peaks", representing (from left to right) loss of data Bit 8 down to loss of data Bit 0. The final upward trend at the right of each curve indicates that only the initiating pulse (e.g. the speed pulse) is being transmitted. It is appreciated that different numbers of peaks may occur in different embodiments under different conditions (e.g. a target wheel is rotating backwards rather than forwards, or different numbers of bits are used in the protocol).

Figure 2:
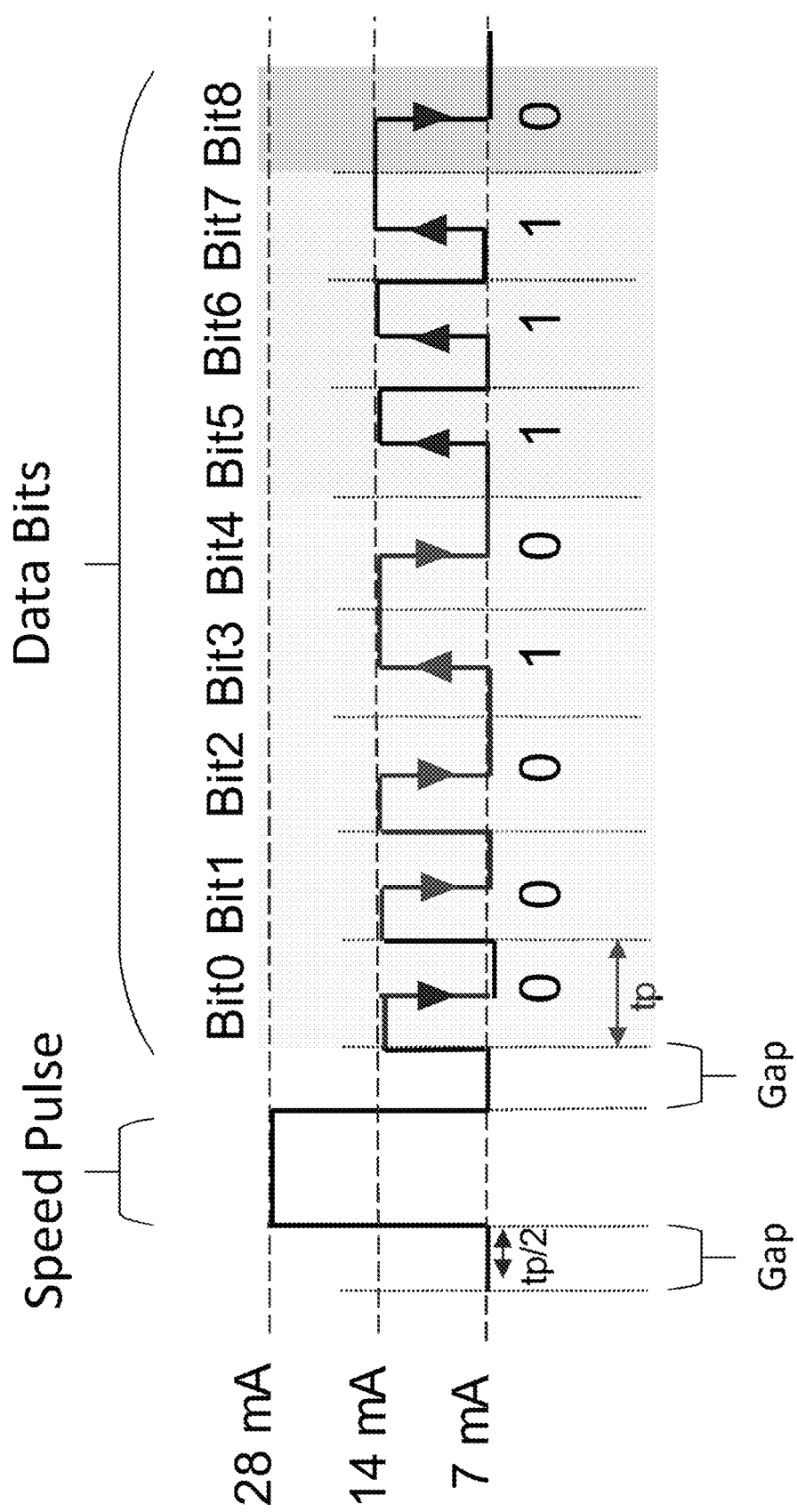
FIG. 2 shows a packet of data having digital electrical pulses according to a known data protocol (the "AK" protocol)
Figure 3A:
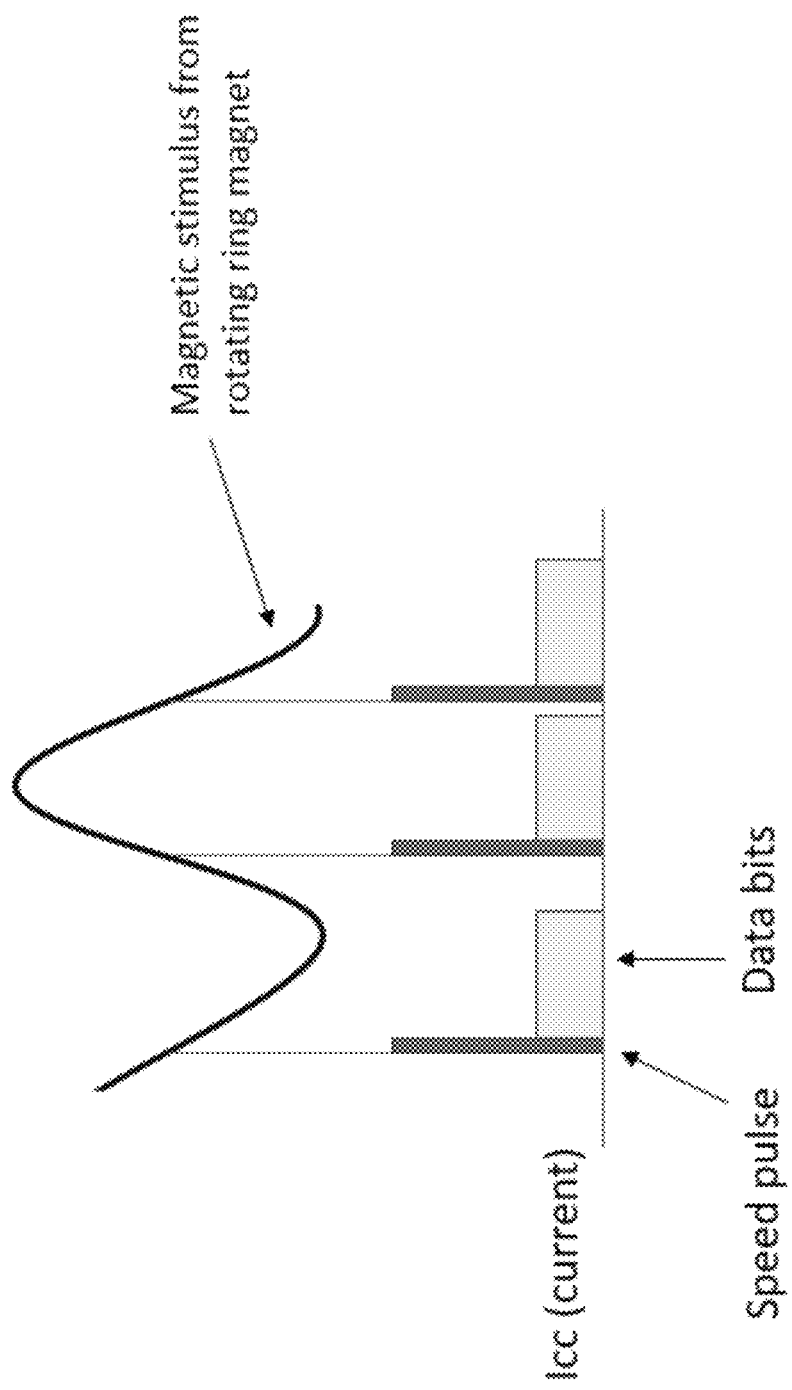
FIG. 3A schematically shows timing of fixed-length data packets generated by a wheel-speed sensor at progressively higher wheel speeds.
Figure 3B:
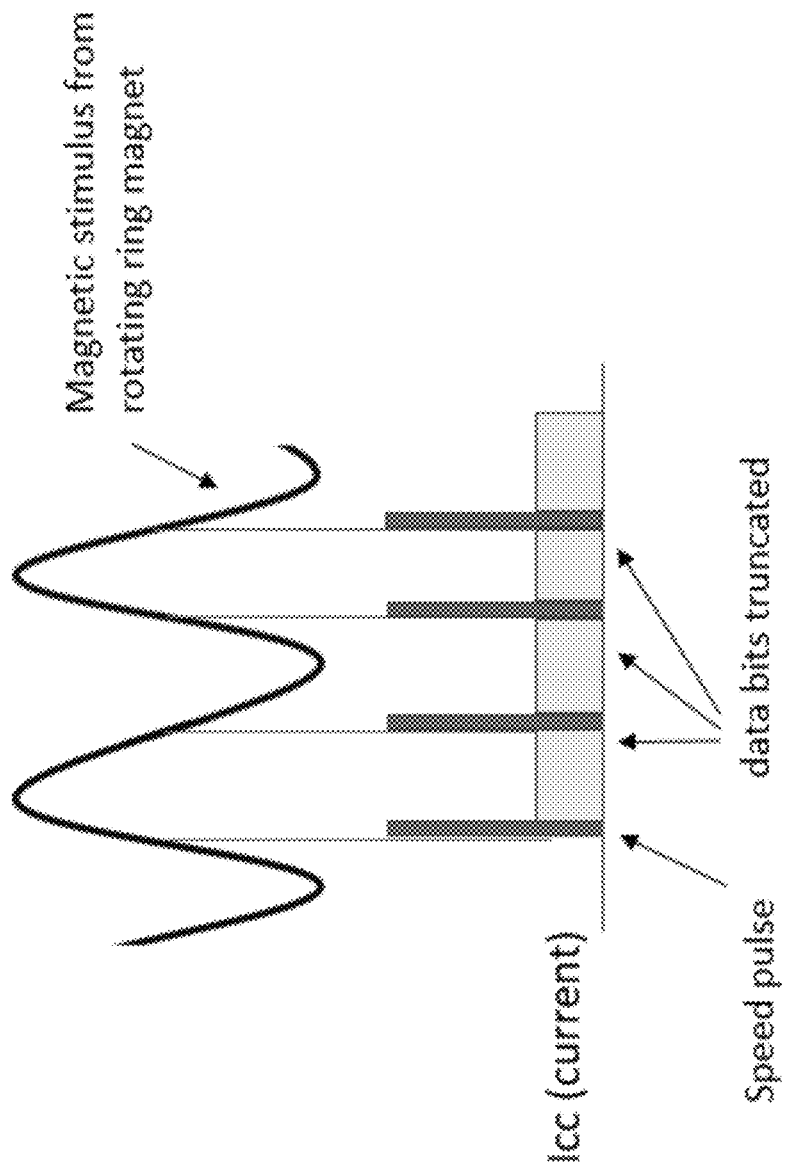
FIG. 3B schematically shows truncation of fixed-length data packets generated by a wheel-speed sensor above a data loss speed threshold.

The prior art protocol demonstrates the highest power consumption and worst data loss characteristics. This protocol messages as shown in FIG. 2 have a pulse width $t_p$=50 μs and take 75+9*50=525 μs to transmit. Therefore message truncation beginning with Bit 8 occurs at approximately 1800 Hz signal (i.e. speed pulse) frequency. Assuming a magnetic sensor with 160 pole pairs, 2 pulses per cycle, and a tire circumference of 2 meters, this corresponds to vehicle speed of only 41 km/h (25 mph) as indicated in FIG. 6. The average current (Icc) when this occurs is just under 12 mA.

By contrast, embodiments that combine the initial target pulse with the first data bit (Bit 0) as a message header, as described above in connection with FIGS. 4A and 5, save one data bit worth of time for each message sent. Rather than the speed pulse and Bit 0 taking 125 ms to transmit as in the prior art protocol, a header as shown in FIG. 4 takes only 75 ms to transmit. So embodiments only lose Bit 8 due to truncation at the target frequency for which the prior art protocol is already losing Bit 7; disclosed embodiments lose Bit 7 when the prior art protocol is losing Bit 6, and so on. As a result, the "peaks" that represent bit loss are shifted to higher frequencies that represent higher wheel speeds, as shown in FIG. 6. Moreover, as discussed in connection with FIGS. 7A and 7B below, embodiments may split data over multiple messages using Bit 4 through Bit 7, so data is only truly lost due to truncation after Bit 4 is lost, as indicated.

The two curves labeled "Forward" and "Reverse" correspond to current usage when communicating headers according to FIGS. 5A and 5C, respectively. It should be noted that, as described above, vehicles preferentially rotate their wheels in a forward direction rather than the reverse direction, and thus the current profile of FIG. 5A has a lower Icc than the current profile of FIG. 5C. This difference is seen in FIG. 6—the "Forward" curve has a lower Icc than the "Reverse" curve, and it is expected that wheel speed sensors using an embodiment will spend most of their time communicating data using the current of the "Forward" curve. It is appreciated, of course, that embodiments used for sensing properties other than wheel speed will be modified according to those other properties, and that a person having ordinary skill in the art will know how to make these modifications without undue experimentation.

In some embodiments, the pulse width $t_p$ may be shortened if the ECU (or other signal processing device) is capable of discriminating pulses at increased rates. For example, if $t_p$ is reduced from 50 μs to 25 μs, then the truncation frequencies (and corresponding vehicles speeds) are doubled. For example, in such an embodiment the loss of Bit 4 (and thus, actual information loss) may occur only at vehicle speeds exceeding 150 km/h (93 mph), well above the normal vehicle operational speed. In any event, decreasing the pulse width by a factor f will advantageously cause an increase of the data truncation frequencies by the same factor f.

It is appreciated that automotive ECUs may use the speed pulse to synchronize their own internal clocks, and therefore pulse widths may be limited in how short they may be made. Indeed, many ECUs may expect pulse widths specified by prior art protocols, and modifying such ECUs to synchronize on a combined header may be cost prohibitive. Such ECUs nevertheless may be modified in accordance with other aspect of embodiments disclosed herein, such as those described in FIG. 4B and FIG. 7 through FIG. 9.

The combination of the initial target pulse with Bit 0 decreases the amount of time that current is flowing to transmit a message, advantageously resulting in reduced power use and average current Icc. This is shown in FIG. 6 as well, with a drop in power use of up to about 15% in the vehicle normal operating range of speeds.

In the plotted embodiment, the current levels are 28 mA, 14 mA, and 7 mA. It is appreciated that the power use may be further advantageously decreased if the ECU is configured to detect lower current levels. Thus, another embodiment may use 28 mA, 10 mA, and 7 mA. Other embodiments may use other current levels according to other design constraints according to the concepts, techniques, and structures disclosed herein.

Figure 7A:
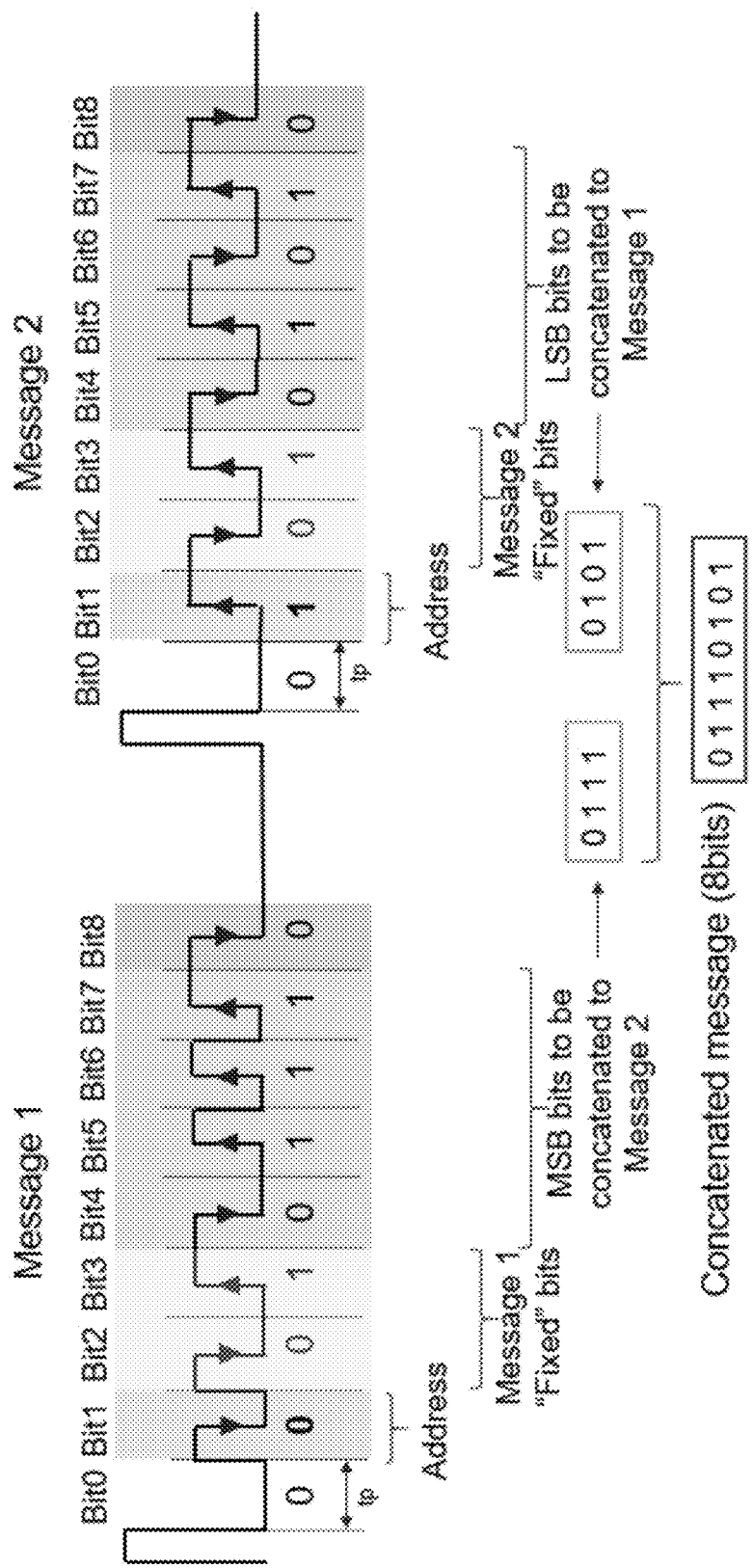
FIG. 7A illustrates a method according to an embodiment of concatenating two messages having different message addresses to form a long message.

FIG. 7A illustrates a method according to an embodiment of concatenating two messages having different message addresses to form a long message. In this embodiment, the protocol uses a multiplexing principle to transfer more information/data bits through the use of multiple output messages sent in a sequence, with the leading information (e.g. Bit 1) being a message identifier or address. Information from multiple messages may be combined to increase possible code combinations, using one or more bits to encode the message number and keep track of which message is generated. The message address code increments once the message is completely transmitted to transmit the following message. It is appreciated that the method shown in FIG. 7A may be used in conjunction with the embodiments shown in FIGS. 4 to 6.

Thus, in FIG. 7A, message 1 and message 2 are both 9 bits. Of these, Bit 0 may be viewed as part of the header described in connection with FIGS. 4 and 5. Bit 1 is the address bit, which distinguishes the two messages. Bits 2 and 3 are fixed, in the sense that they may be programmed by the end user and thus their values are not used by the protocol now being described. Bits 4 through 7 are the data bits to be concatenated. In this illustrative Figure, message 1 bits 4 through 7 contain the most significant bits (MSB) 0111 of an 8-bit value, while message 2 bits 4 through 7 contain the least significant bits (LSB) 0101 of the value. In each message, bit 8 is a parity or check bit.

The electronic sensor circuit transmits message 1 to the ECU, then message 2. The ECU extracts the address bit (Bit 1) from each incoming message. If the address bit is a 0, then the ECU knows that the data payload represents the MSB of an 8-bit value; if the address bit is a 1, then the ECU knows that the data payload represents the LSB of an 8-bit value. Thus, when the ECU has both the MSB and LSB of the value, it concatenates them as indicated to recover the full value, namely 01110101.

It is appreciated that data values of any length may be transmitted using this technique. Concretely, FIG. 7A shows transmission of an 8-bit data value. To transmit a 16-bit data value, the electronic sensor circuit may sequentially transmit two 9-bit messages having address value 0 then two 9-bit messages having address value 1. The ECU concatenates data from all sequential messages having address 0, then all sequential messages having address 1. When a subsequent message having address 0 is again encountered, the ECU recognizes that its data payload belongs to a new data value, and begins the cycle again.

Figure 7B:
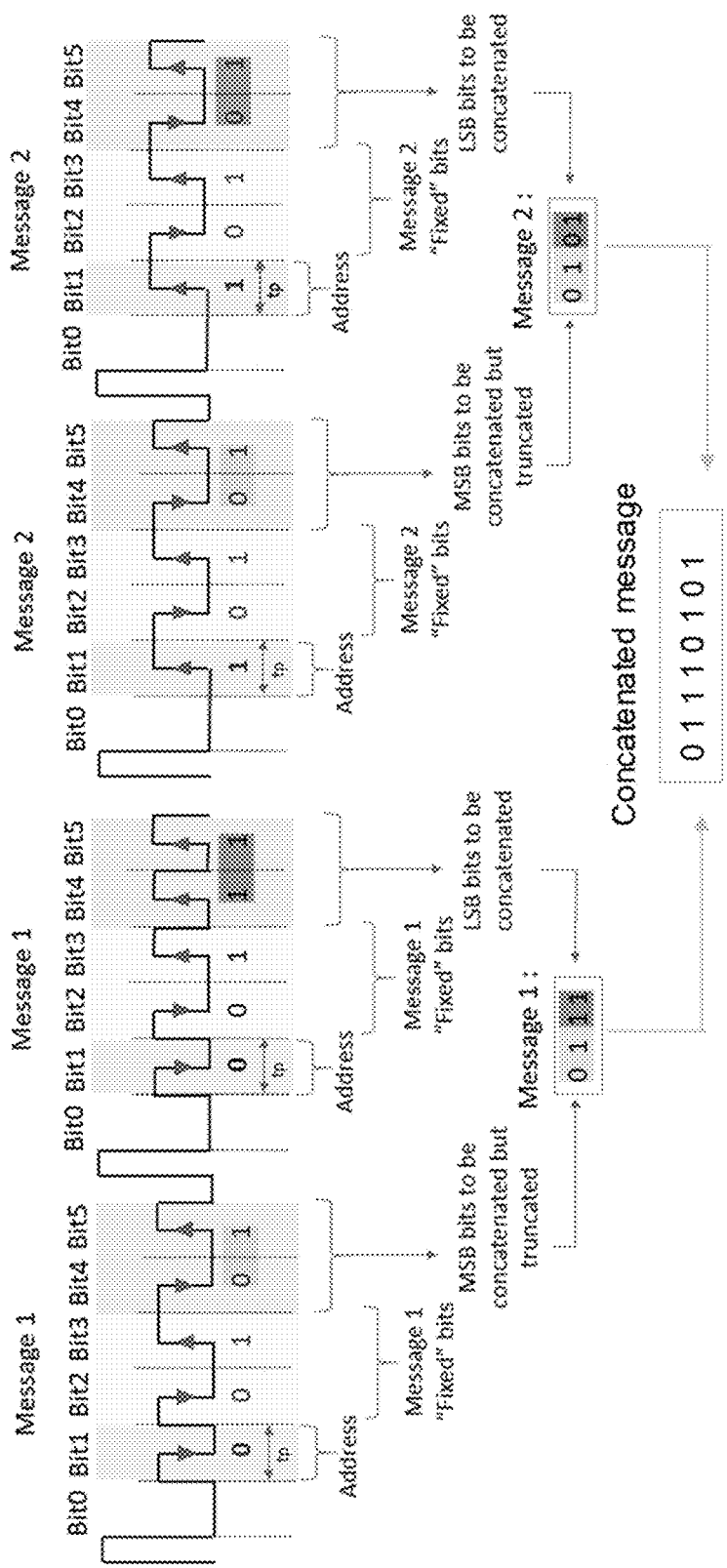
FIG. 7B illustrates a method according to an embodiment of splitting data between messages during message truncation.

In this connection, FIG. 7B illustrates a method according to an embodiment of splitting data between messages during message truncation. In FIG. 7B, the same 8-bit value 01110101 as in FIG. 7A is to be transmitted to the ECU; however, message truncation is occurring and only bits 0 through 5 of each message are being transmitted. To handle truncation, the multiplex concept encodes the missing bits (truncated bits) into following packets. To do so, the message address does not change until the entire message content has been delivered, using as many packets as necessary, such that it is possible to reconstruct the entire (non-truncated) message. Additionally, embodiments may force a low current state once the last truncated bit has been delivered to the ECU, to facilitate decoding. It is appreciated that the method shown in FIG. 7B may be used in conjunction with embodiments shown in FIGS. 4 to 6, and with the method shown in FIG. 7A.

Thus, in FIG. 7B message 1 is divided into two packets. The first packet of message 1 contains the first two MSB 01, and the second packet contains the second two MSB 11. Likewise, message 2 is divided into two packets. The first packet of message 2 contains the first two LSB 01, and the second packet contains the second two LSB 01. The ECU receives four packets. As the first two packets have the same message address 0, the ECU concatenates them to recover message 1, the MSB data 0111. Similarly, the ECU concatenates the two packets having the same message address 1 to recover message 2, the LSB data 0101. Finally, the ECU concatenates the two messages to recover the full 8-bit value 01110101, as desired.

It is appreciated that the above illustration is not limiting, and the multiplex concept disclosed herein can be extended to using more messages, adding message address bits, using more bits in each message, decreasing or increasing the number of bits to be concatenated, or replacing the fixed message bits with bits to be concatenated.

Figure 8A:
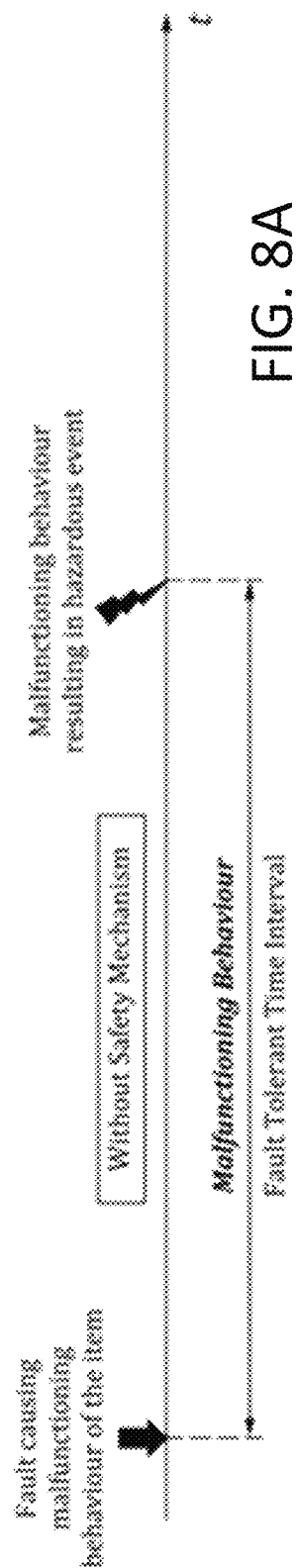
FIG. 8A illustrates a malfunctioning behavior resulting in a hazardous event.
Figure 8B:
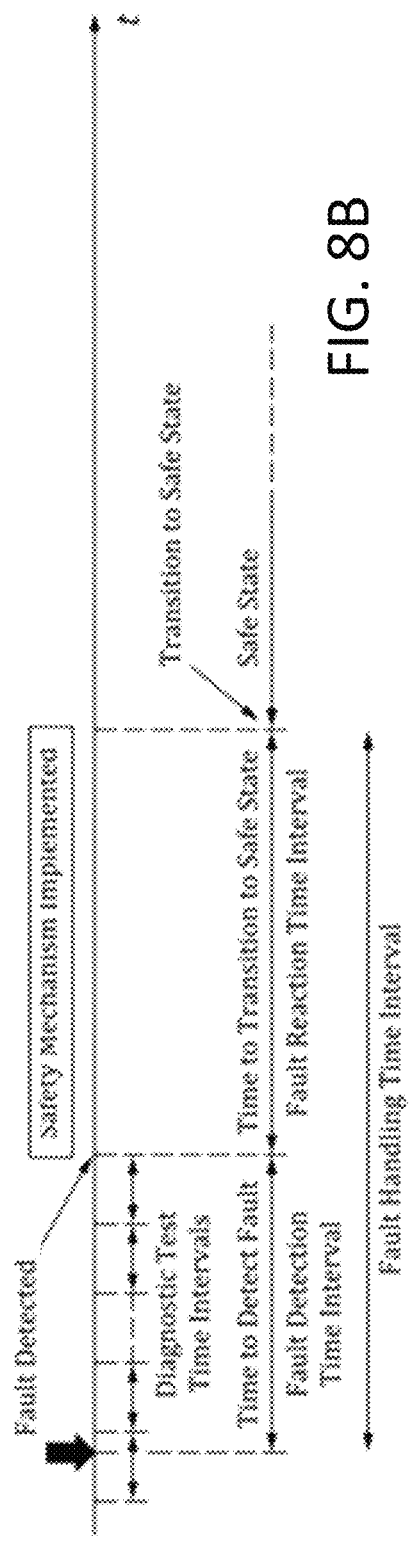
FIG. 8B illustrates a corrective principle according to an embodiment.
Figure 8C:
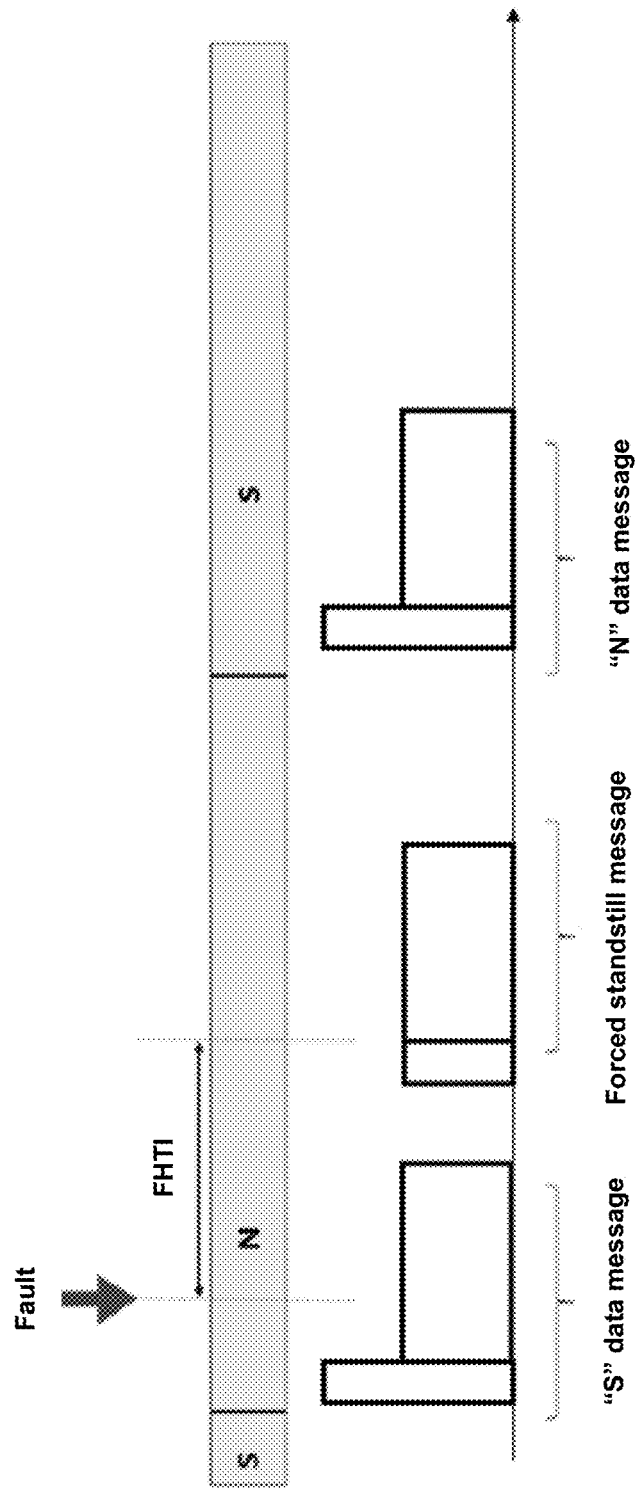
FIG. 8C illustrates a method according to an embodiment of transmitting a second packet of data in response to receiving a signal indicative that a fault has occurred.

FIGS. 8A, 8B, and 8C (collectively, "FIG. 8") show improved fault handling according to disclosed embodiments. In particular, FIG. 8A illustrates a malfunctioning behavior resulting in a hazardous event, FIG. 8B illustrates a corrective principle according to an embodiment, and FIG. 8C illustrates a method according to an embodiment of transmitting a second packet of data in response to receiving a signal indicative that a fault has occurred. It is appreciated that the method shown in FIG. 8 may be used in conjunction with embodiments shown in FIGS. 4 to 6, 7A, and 7B.

A problem with existing data communications protocols is that errors are not timely encoded to resolve fast faults. That is, a fault in the target (e.g. the wheel being sensed) may occur at any time, and must be resolved within a Fault Tolerant Time Interval (FTTI) or a hazardous event will result, as shown in FIG. 8A. However, error data are encoded either on a normal message triggered by receipt of a speed pulse (which is itself determined by the target being sensed), or on a standstill message that is emitted during idle periods (which are, in the case of some protocols, at intervals of 150 milliseconds, i.e. 150,000 μs). If an automobile tire has a critically low pressure, for example due to a puncture, waiting any significant length of time to take corrective action could have serious or fatal consequences.

To address this problem, some embodiments of the concepts, techniques, and structures disclosed herein determine to detect and resolve faults within a Fault Handling Time Interval (FHTI) that is less than the FTTI, as shown in FIG. 8B. The FHTI may be included in industry standards, such as the Automotive Safety Integrity Level (ASIL) defined by the International Organization for Standardization (ISO). For example, the FHTI may be between 1 and 20 milliseconds, and may depend on a sensor safety level.

The FHTI has two parts: a Fault Detection Time Interval (FDTI), which is a period between fault occurrence and fault detection, and a Fault Reaction Time Interval (FRTI), which is a period after fault detection during which the system (e.g. the automobile) is transitioned to a safe state using a safety mechanism. Faults may be detected during the FDTI using a variety of measures known in the art, including fault detection diagnostic circuitry that is beyond the scope of this disclosure.

FIG. 8C illustrates a method of responding to a detected fault within the FHTI, namely by transmitting a second packet of data in response to receiving a signal indicative that a fault has occurred. In this Figure, a magnetic direction sensor detects a transition between a south-facing and a north-facing magnetic field, and transmits an "S" data message. This "S" data message may be formatted and transmitted in accordance with the above discussion of FIGS. 4 through 7.

During transmission of the "S" data message, a fault occurs, as indicated by the arrow. The timing of the fault and the standard definition of the FHTI determine the indicated interval in which the system must respond to the fault and enter a safe state. Note that this FHTI expires well before the next target-determined "N" data message is due to be transmitted, because the target is not changing state quickly enough (e.g. an automobile is moving at a relatively slow speed for which an accident would nevertheless be dangerous). Note also that the fault was after transmission of the header of the "S" data message, which could have indicated presence of an error. In this situation, known protocols would wait until the following speed pulse (or the elapse of 150 ms, whichever is less) to transmit the error, increasing reaction time.

To meet the required FHTI, the embodiment transmits a second, forced data packet having a message that indicates the fault or error condition immediately. That is, as soon as the "S" data message is finished being transmitted, the electronic sensor circuitry emits a "standstill" data packet. This data packet may be identified as abnormal by an initial pulse that has a current level that is different than the current level that would be emitted for a typical speed pulse (or otherwise differs from what the ECU is "expecting" from a normal data message, e.g. has a longer duration). Thus, whether by its timing or the contents of its message (or both), the error data packet may indicate that the electromagnetic property of the target was not sensed, or that the electronic sensor circuitry has detected an internal fault. The ECU will receive this message and recognize its abnormality, then immediately take corrective action such as slowing the vehicle, thereby satisfying the FHTI timing requirement as shown. Note that the ECU does not need to receive the entire standstill message to determine that corrective action is required.

The particular type of error or fault may be encoded in the extra message. The ECU may parse these encoded data in parallel with performing the "all-faults" corrective action described above. Then, based on the particular type of fault, the ECU may take further, fault-specific corrective action such as illuminating an indicator lamp or other action (including, without limitation, other automatic actions for controlling the system or the sensed target).

It is appreciated that informing an ECU of the type of fault is important to ensuring safety. However, it is also appreciated that informing the ECU of the ongoing operation of the sensed target is equally, if not more important. Therefore, in some embodiments, the speed pulse message takes transmission priority over any forced fault message. That is, when the next regular data message should be sent, the electronic sensor circuit interrupts any fault message transmission to instead send the regular data message.

Figure 9A:
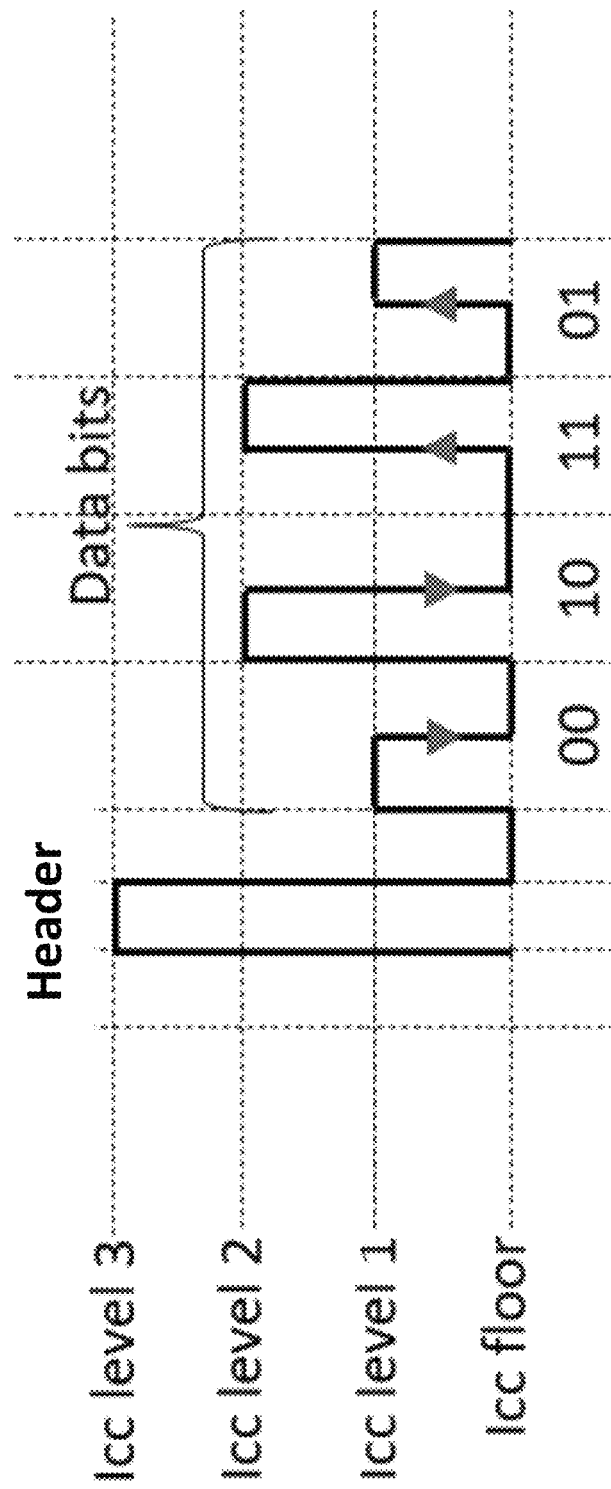
FIG. 9A shows digital pulses according to an embodiment that uses an additional current level to increase the data rate.

FIG. 9A shows digital pulses according to an embodiment that uses an additional current level to increase the data rate. Some prior art protocols transmit data messages using three current levels, i.e. 28 mA, 14 mA, and 7 mA as shown in FIG. 2. The value of 28 mA indicates receipt of a speed pulse, while the value of 7 mA is a current floor at which all data pulses begin and end to indicate proper operation of the electronic sensor circuit. However, illustrative embodiments may use additional current levels to increase the amount of information that is conveyed using each pulse.

Thus, in FIG. 9A is shown a packet of data in which a sensed signed magnitude of an electromagnetic property of the target is encoded according to a first current level, and the message is encoded according to at least three other levels. The first current level, denoted "Icc level 3", may be 28 mA as currently used, or some other current level. One of the other levels may be the current floor (denoted "Icc floor", e.g. 7 mA as currently used). The other current levels may be intermediary to the maximum and minimum current levels, and may be 14 mA (denoted "Icc level 2") and 10 mA (denoted "Icc level 1"), or other convenient current levels. Embodiments may reduce any of these current levels to decrease power consumption.

It is appreciated that the use of a separate current level to encode only the sensed signed magnitude of the electromagnetic property of the target may be advantageous to facilitate a data consumer to synchronize on its timing and to detect truncation of data messages. It is further appreciated, however, that such reserved use of this first current level does not limit the number of other current levels that may be used to encode message data. While FIG. 9A shows only three additional current levels (i.e. Icc floor, Icc level 1, and Icc level 2), it is contemplated that embodiments may use more than three additional current levels to further increase the amount of information that can be conveyed by the waveform of each pulse.

Encoding of different patterns of data bits is now explained with reference to FIG. 9A. In illustrative embodiments, each message pulse encodes two bits of information, rather than only one bit as in other protocols. Thus, a "00" or "zero" encoding is accomplished by a falling edge from level 1 to the current floor; a "01" or "one" encoding uses a rising edge from the current floor to level 1; a "10" or "two" encoding uses a falling edge from level 2 to the current floor; and a "11" or "three" encoding uses a rising edge from the current floor to level 2. It is appreciated that other encodings may be used in different embodiments, and thus that the particular encoding shown in FIG. 9A should not be understood as limiting.

Note that the waveform of each pulse begins and ends at the current floor, to indicate proper operation of the electronic sensor circuit as known in the art. A person having ordinary skill in the art should appreciate how to extend the encoding principle shown in FIG. 9A to embodiments having more than three additional current levels.

Figure 9B:
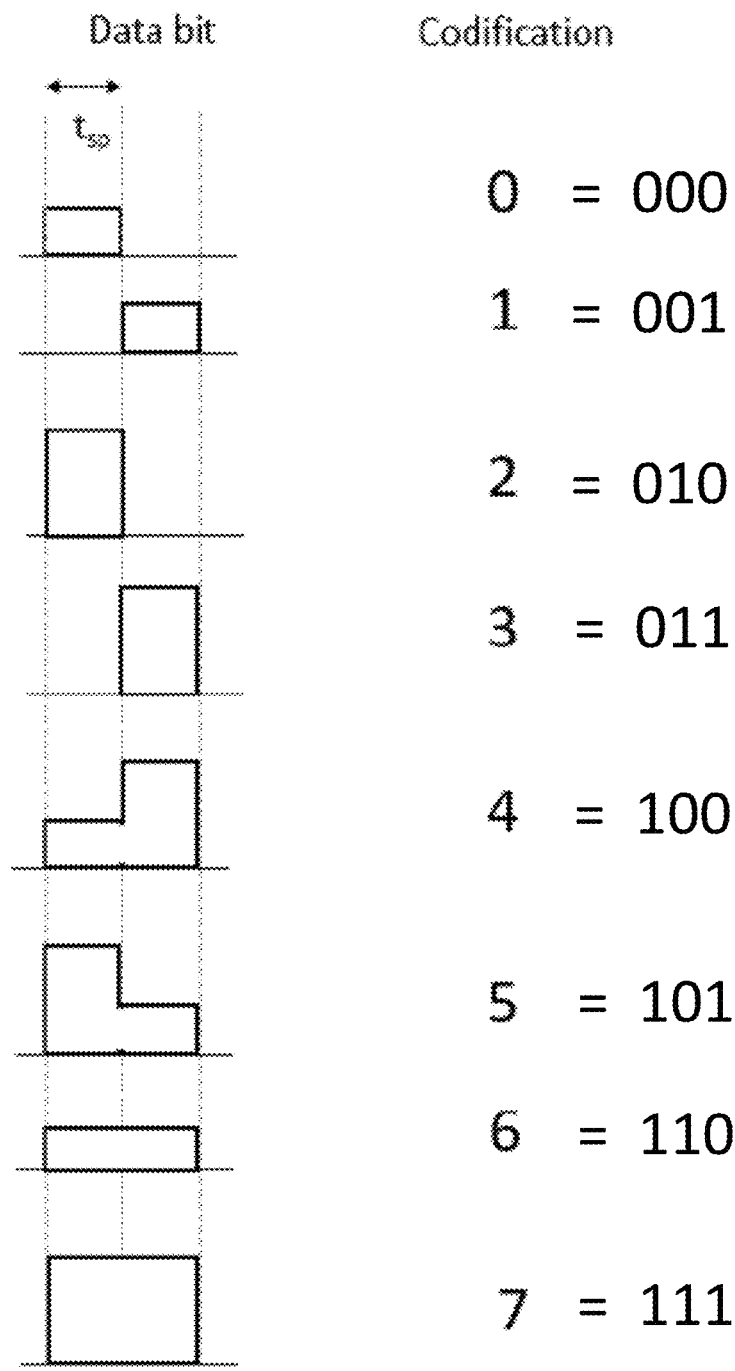
FIG. 9B shows digital pulses according to an embodiment that uses the additional current level to further increase the data rate.

If the requirement to transmit current only from or to the current floor is relaxed, then even more information may be communicated by each pulse. In this connection, FIG. 9B shows digital pulses according to an embodiment that uses the additional current levels to further increase the data rate. In this Figure, three bits of information are communicated with each pulse. As before, the "zero" encoding uses a falling edge from level 1 to the current floor; however, with this protocol, "zero" now represents the three bits "000" as indicated. Likewise, "one" is encoded using a rising edge from the current floor to level 1, "two" uses a falling edge from level 2 to the floor, and "three" uses a rising edge from the floor to level 2.

Additional information may be transmitted in each pulse using rising and falling edges between the two additional current levels, rather between the current floor and one of the additional current levels, and by a lack of edges entirely. Thus, "four" or "100" may be encoded as a rising edge between level 1 and level 2; "five" or "101" may be encoded as a falling edge between level 2 and level 1; "six" or "110" may be encoded as a fixed transmission (no rising or falling edge) at level 1; and "seven" or "111" may be encoded as a fixed transmission at level 2.

It is appreciated that embodiments of FIGS. 9A and 9B, or either of them, may be used in conjunction with embodiments shown in FIGS. 4 to 6, 7A, 7B, and 8.

Figure 10:
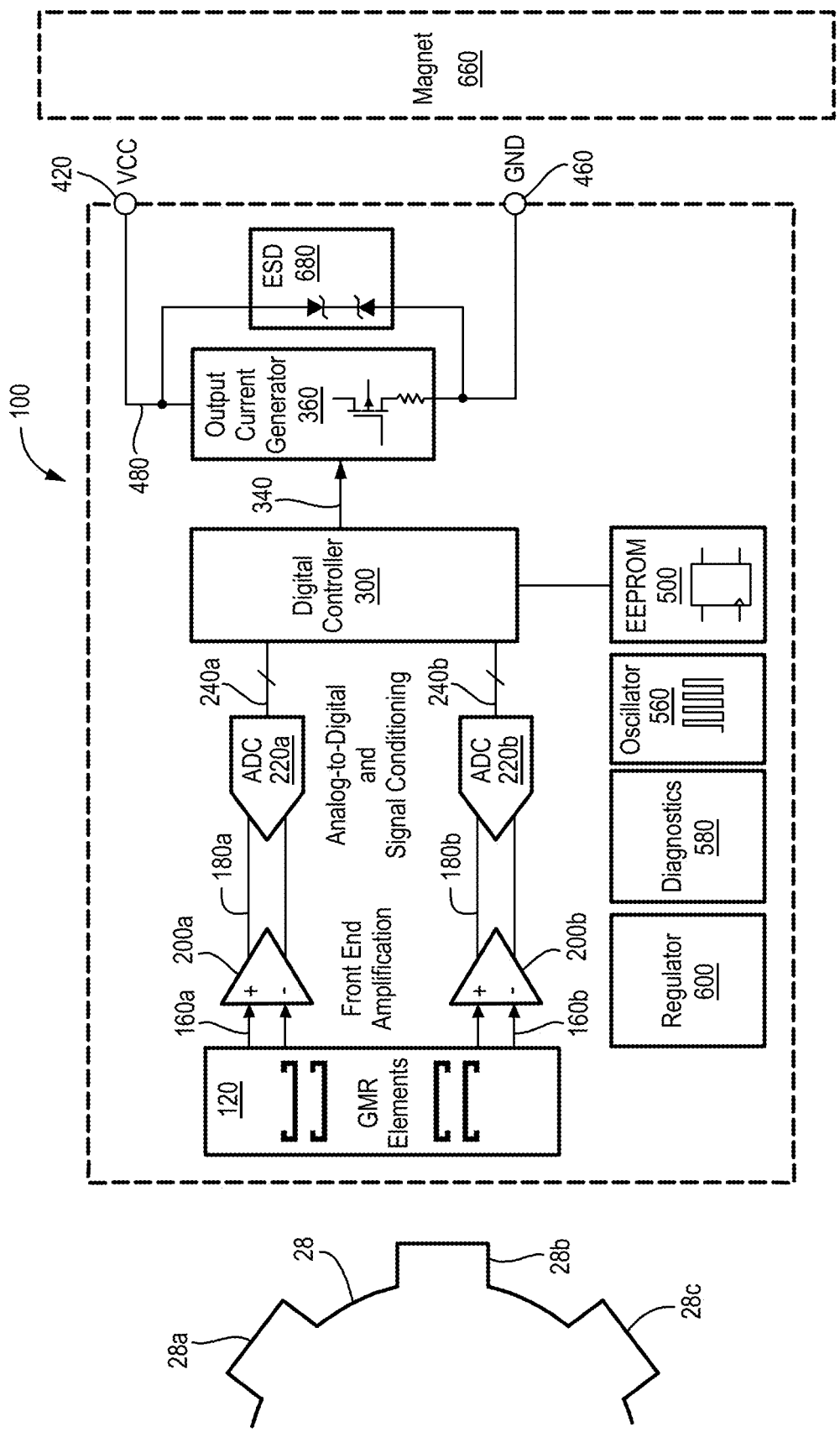
FIG. 10 is a functional block diagram of an electronic circuit according to an embodiment.

Referring to FIG. 10, a magnetic field sensor 100 includes at least one magnetic field sensing element 120 configured to generate a magnetic field signal, and differential magnetic field signals 160a, 160b, indicative of a magnetic field associated with a target 28. Sensing elements 120 can take a variety of forms, such as the illustrated GMR yokes as may be arranged in one or more bridge or other configurations in order to generate one or more single-ended or differential signals indicative of the sensed magnetic field. Two differential magnetic field signals 160a, 160b are shown with their corresponding processing channels. It is appreciated that the sensing elements 120 may produce more or fewer differential magnetic field signals in various embodiments, and thus that the depiction of exactly two such channels in FIG. 10 is not limiting.

Each of the magnetic field signals 160a, 160b is coupled to a respective processing channel that can include an amplifier (i.e., front end amplifier) 200a, 200b and an analog-to-digital converter (ADC) 220a, 220b. Output signals 180a, 180b of the amplifiers 200a, 200b can be adjusted for gain and/or offset. The ADCs 220a, 220b may take various forms and may include one or more filters, such as a low pass filter and/or notch filter, and as may take the form of a sigma-delta modulator to generate respective digital magnetic field signals 240a, 240b.

Digital magnetic field signals 240a, 240b can be coupled to a digital controller 300 for processing. Digital controller 300 processes the digital magnetic field signals 240a, 240b to determine the speed, position, and/or direction of movement, such as rotation of target 28. Controller 300 can combine this information with fault or other diagnostic information in some embodiments to output one or more digital signals 340 to output signal generator 360. Output signal generator 360 encodes the information provided by controller output 340 (e.g., speed and/or direction information) to provide the sensor output signal 480.

Output signal generator 360 can provide the sensor output signal 480 in various formats, such as a so-called two-wire format as illustrated, in which the output signal is provided in the form of current pulses on the power connection to the sensor (i.e., on a VCC connection at terminal 420 which can be compared to a GND connection at terminal 460) or a three-wire format in which the output signal is provided at a separate dedicated output connection. Formats of the output signal 480 can include a variety of formats, for example a pulse-width modulated (PWM) signal format, a Single Edge Nibble Transmission (SENT) format, a Serial Peripheral Interface (SPI) format, a Local Interconnect Network (LIN) format, a CAN (Controller Area Network) format, an Inter-Integrated Circuit (I²C) format, or other similar signal formats.

The digital controller 300 may be configured to function as a detector to generate the sensor output signal 480 based on a comparison of the digital magnetic field signal 240a, 240b to a threshold value. More particularly, the controller output signal 340 includes transitions occurring at switch points having a predetermined relationship with respect the digital magnetic field signal crossing the threshold value. The controller output signal 340 can be a binary, two-state signal that has transitions or can be pulses occurring at the switch points for example. Movement speed of the target 28 can be detected in accordance with the frequency of the binary signal or pulses as applicable (i.e., speed pulses).

A direction of rotation of the target 28 can be determined in embodiments containing multiple sensing elements 120 and respective processing channels as shown, which processing channels are configured to generate phase separated magnetic field signals 240a, 240b (as are sometimes referred to as channel signals). The direction of rotation can be determined based on a relative phase or relative time difference (e.g., lag or lead) of a particular edge transition of detector output signals associated with the phase separated magnetic field signals 240a, 240b.

Additional elements of the sensor 100 can include a memory device, as may take the form of an EEPROM 500, an oscillator 560, and a diagnostics circuit 580. An ESD protection circuit 680 can be coupled between the power terminal 420 and ground terminal 460. A regulator 600 can provide power to circuitry of the sensor.

Target 28 can have a variety of forms, including, but not limited to a gear having gear teeth 28a-28c or a ring magnet having one or more pole pairs. Also, linear arrangements of ferromagnetic objects that move linearly are possible. Magnetic field sensor 100 may take the form of a rotation detector to detect passing gear teeth, for example, gear teeth 28a-28c of a ferromagnetic gear or, more generally target object 28. A permanent magnet 660 can be placed proximate to the gear 28, resulting in fluctuations of a magnetic field proximate to the gear as the gear rotates so as to form a so-called "back-bias" arrangement.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, a current sensor, or a proximity detector. A rotation detector can sense rotation of an object, for example, advance and retreat of magnetic domains of a ring magnet or advance and retreat of gear teeth of a ferromagnetic gear. The term "movement detector" can be used to describe either a rotation detector or a magnetic field sensor that can sense different movement, e.g., linear movement, of a ferromagnetic object, for example, linear movement of magnetic domains of a ring magnet or linear movement of gear teeth of a ferromagnetic gear.

Magnetic field sensors are used in a variety of applications, including, but not limited to an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field. The circuits and techniques described herein apply to any magnetic field sensor capable of detecting a magnetic field.

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field programmable gate array (FPGA)). Processing can be implemented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

It should be understood that a so-called "comparator" can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of transmitting packets of data that pertain to a target, the method comprising:
    sensing a first signed magnitude of an electromagnetic property of the target;
    transmitting a first packet of data, the first packet of data having a first header that encodes the first signed magnitude, followed by first payload pulses that encode a first portion of a message associated with the target;
    sensing a second signed magnitude of the electromagnetic property of the target; and
    transmitting a second packet of data, the second packet of data having a second header that encodes the second signed magnitude, followed by second payload pulses that encode a second portion of the message associated with the target.

2. The method according to claim 1, wherein the target is associated with a magnetic field, and sensing the property of the target comprises sensing a magnitude and a direction of the magnetic field.

3. The method according to claim 2, wherein the target comprises a wheel, and the signed magnitude of the magnetic field indicates a direction and speed of rotation of the wheel.

4. The method according to claim 1, wherein transmitting each packet of data further comprises transmitting digital electrical pulses that encode one or more bits of configurable information, a parity bit for the second packet of data, or both.

5. The method according to claim 1, wherein transmitting the first packet of data further comprises transmitting digital electrical pulses that encode a first message address.

6. The method according to claim 5, wherein transmitting the second packet of data further comprises transmitting digital electrical pulses that encode the first message address, wherein the message comprises the first portion concatenated with the second portion.

7. The method according to claim 5, wherein transmitting the second packet of data further comprises transmitting digital electrical pulses that encode a second message address, wherein the message comprises the first portion concatenated with the second portion.

8. The method according to claim 5, wherein an encoding format of the first and second payload pulses is determined by the first message address.

9. An electronic circuit for transmitting packets of data that pertain to a target, the circuit comprising:
    at least one sensing element for repeatedly sensing a signed magnitude of an electromagnetic property of the target;
    an output signal generator for transmitting packets of data; and
    a controller for responding, to the at least one sensing element sensing the property of the target, by causing the output generator to transmit a plurality of packets of data, each packet of data having a header that encodes a sensed, signed magnitude followed by payload pulses that encode a respective portion of a message associated with the target;
    wherein the message comprises a concatenation of the respective portions.

10. The circuit according to claim 9, wherein the target is associated with a magnetic field, and sensing the property of the target comprises sensing a magnitude and a direction of the magnetic field.

11. The circuit according to claim 10, wherein the target comprises a wheel, and the signed magnitude of the magnetic field indicates a direction and speed of rotation of the wheel.

12. The circuit according to claim 9, wherein each packet of data transmitted by the output signal generator further comprises digital electrical pulses that encode one or more bits of configurable information, a parity bit for the packet of data, or both.

13. The circuit according to claim 9, wherein the controller is configured to cause the output generator to transmit, in a first one of the plurality of packets of data, digital electrical pulses that encode a first message address.

14. The circuit according to claim 13, wherein the controller is configured to cause the output generator to transmit, in a second one of the plurality of packets of data, digital electrical pulses that encode the first message address.

15. The circuit according to claim 13, wherein the controller is configured to cause the output generator to transmit, in a second one of the plurality of packets of data, digital electrical pulses that encode a second message address.

16. The circuit according to claim 13, wherein the controller is configured to cause the output generator to transmit the plurality of packets of data according to an encoding format which is determined by the first message address.

17. The circuit according to claim 9, wherein each payload pulse has a fixed duration.

18. The circuit according to claim 17, wherein the fixed duration is at most 25 microseconds.

* * * * *